May 6, 1958

A. GROMAN 2,833,042

DRAFTING APPARATUS

Filed Feb. 21, 1955

INVENTOR.
ANATOL GROMAN
BY
Braddock and Braddock
ATTORNEYS

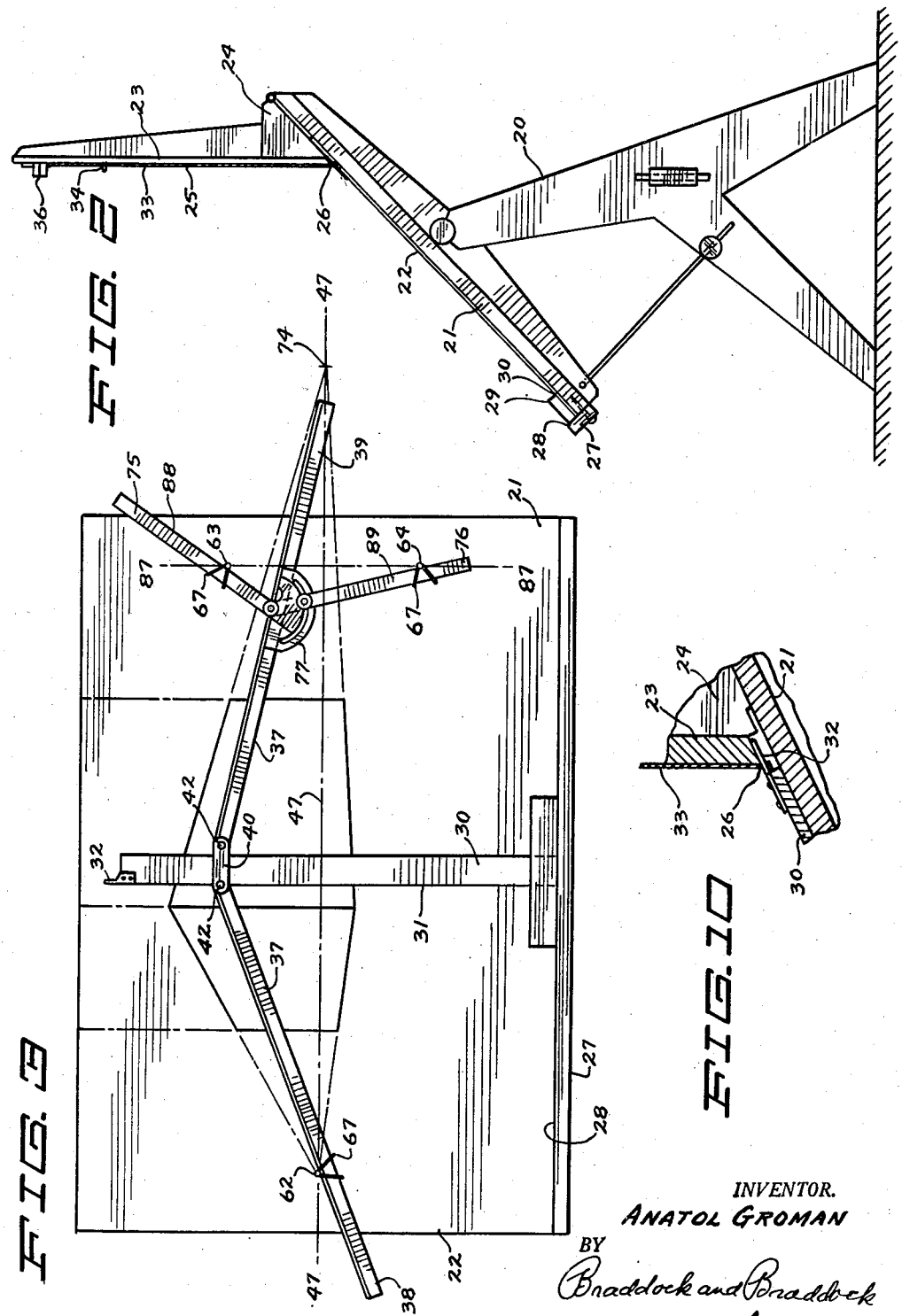

May 6, 1958
A. GROMAN
2,833,042
DRAFTING APPARATUS
Filed Feb. 21, 1955
3 Sheets-Sheet 3
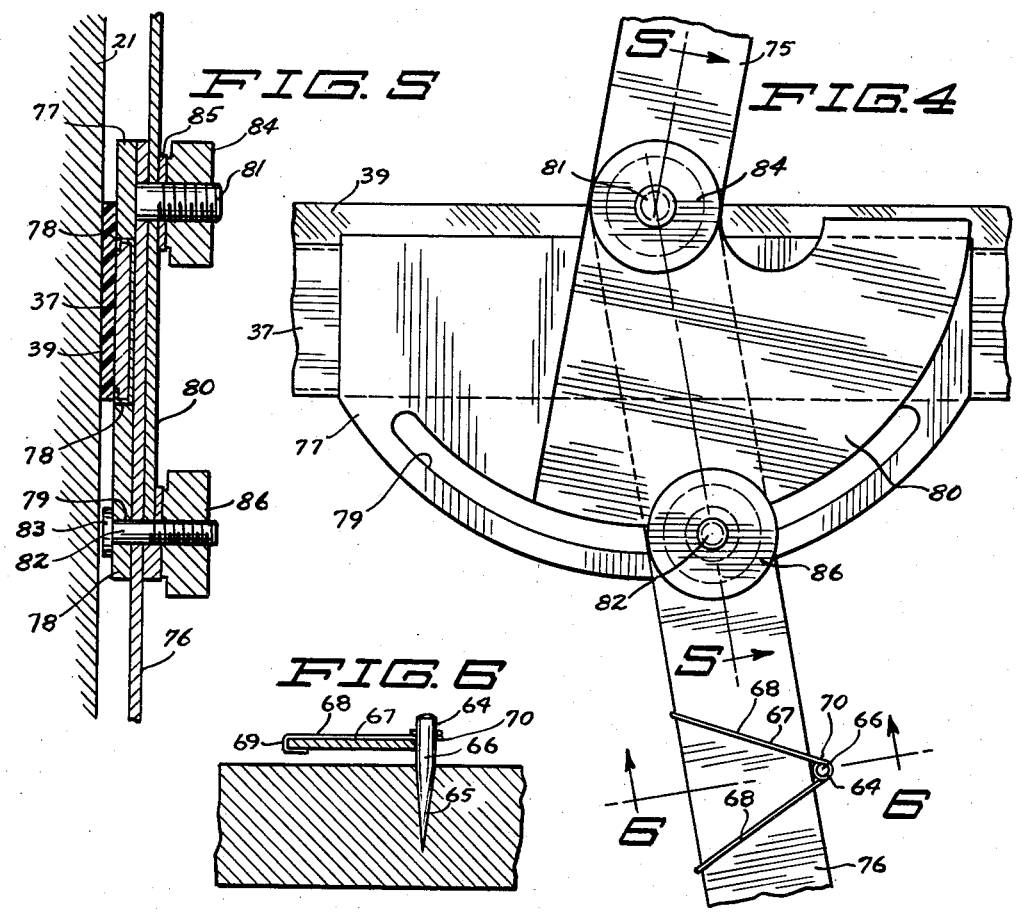
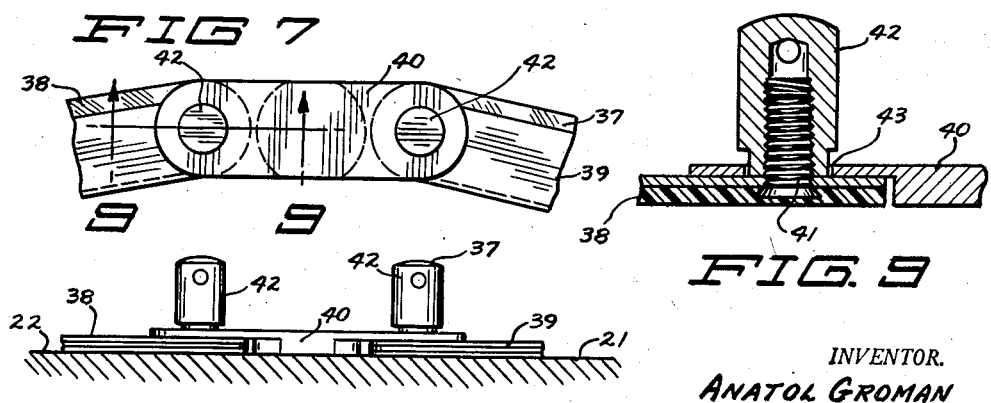
INVENTOR.
ANATOL GROMAN
BY
Braddock and Braddock
ATTORNEYS United States Patent Office 2,833,042
Patented May 6, 1958

2,833,042

DRAFTING APPARATUS

Anatol Groman, Minneapolis, Minn.

Application February 21, 1955, Serial No. 489,627

7 Claims. (Cl. 33—77)

This invention has relation to drafting apparatus which can be used for the rapid production of enlarged perspective drawings directly from plan and elevational views of a given size.

In the present invention, a thread of a thread ruler is used to instantaneously project points on a top or bottom reversed or mirror plan view of an object to the picture plane and a T-square rule connected to said thread is used to locate these points on a drawing plane on a drawing board. An articulated perspective drawing ruler having two straight edge rules each capable of being moved over the surface of the drawing plane but each being fastened to the drawing board in such a manner that a line coincident with each of the straight edges will also be coincident with one of the vanishing points of the perspective drawing. Means is provided as a part of the perspective drawing ruler so that this relationship of each of the rules to the vanishing points can be maintained whether or not the vanishing point is on the drawing board.

In the drawings,

Fig. 2 is a side elevational view of the drafting table of Fig. 1 with the same parts of the invention displayed thereon;

Fig. 3 is a planned view of the drawing table with a perspective drawing ruler and the thread ruler operably mounted thereon;

Fig. 4 is an enlarged fragmentary view of a portion of the perspective drawing ruler showing its connection with the drawing board;

Fig. 5 is an enlarged fragmentary sectional view taken on the line 5—5 in Fig. 4;

Fig. 6 is an enlarged sectional view taken on the line 6—6 in Fig. 4;

Fig. 7 is an enlarged fragmentary view showing a portion of the perspective drawing ruler;

Fig. 8 is a side elevational view of the portion of the perspective drawing ruler disclosed in Fig. 7;

Fig. 9 is an enlarged sectional view taken on the line 9—9 in Fig. 7; and

Fig. 10 is an enlarged fragmentary sectional view taken on the line 10—10 in Fig. 1.

Figure 1:
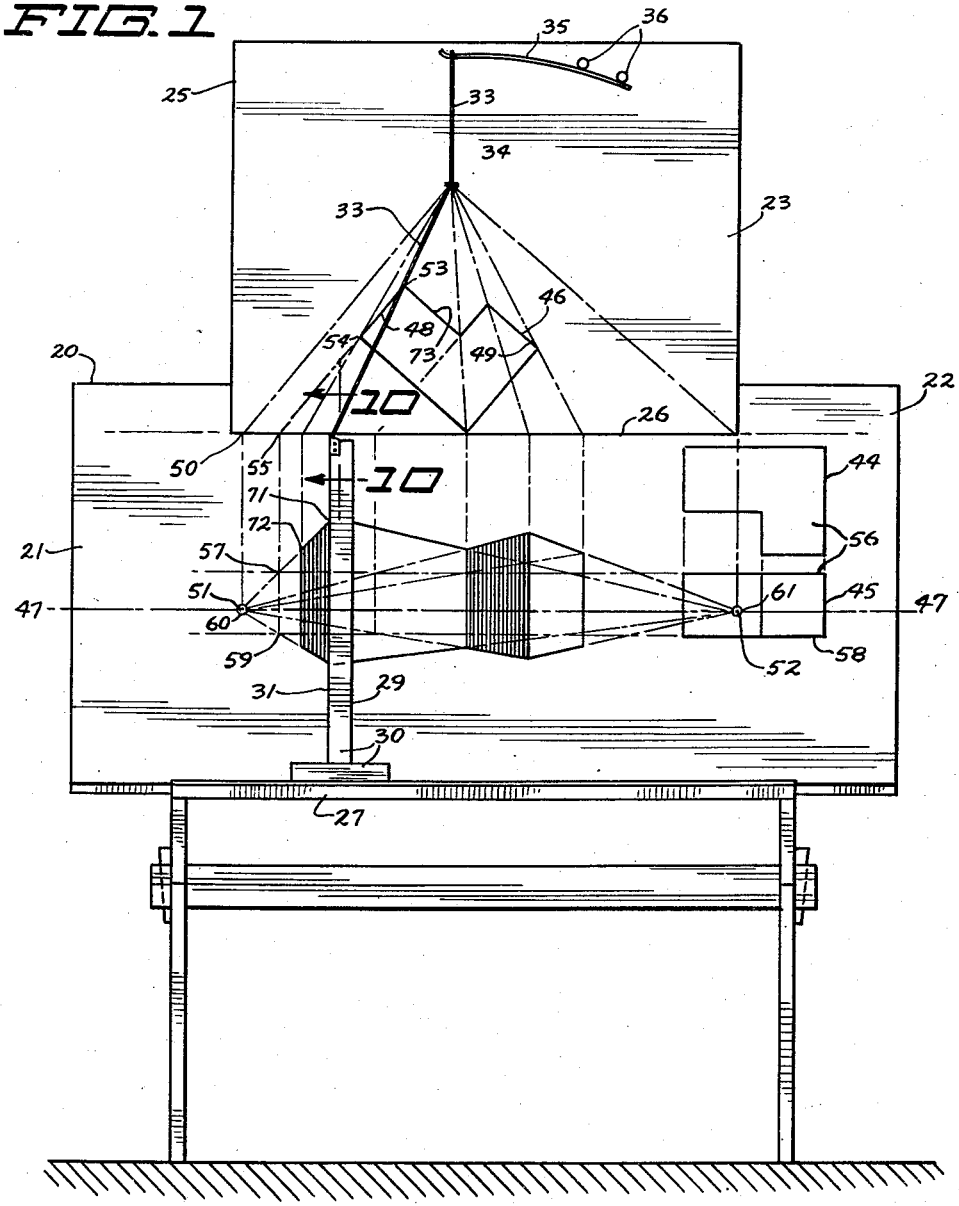
Fig. 1 is a front elevational view disclosing a drafting table including a drawing board for containing the drawing plane, a display board displaying the top or bottom mirror planned view of an object to be drawn in perspective, and a thread ruler in position for use.

Referring to the drawings and the numerals of reference thereon, a drafting table 20 includes a drawing board 21 the top surface of which is designated as drawing plane 22 to which suitable drawing paper can be attached. A display board 23 is also a part of the drafting table 20 and is supported on the drawing board 21 as at 24. An outer surface of the display board is designated as the base plane 25. A lower edge of the surface of the base plane surface of the display board 23 is designated as picture plane line 26. A cleat 27 is supported along a lower edge of the drawing board 21 to extend above the drawing plane 22 to have a surface 28 adjacent and perpendicular to the drawing plane surface of the drawing board 21 and parallel to said picture plane line 26.

A thread ruler 29 consists of a T-square 30 which is provided with a straight edge 31, an outwardly extending finger 32 on said T-square, and a thread 33 fastened to said finger to be coincident with said straight edge of said T-square. A ring pin 34 having an opening therethrough of size to just pass the thread 33 is removably mounted on the display board 23. The thread 33 extends through said opening and is held taut by a resilient arm 35 which is mounted on said display board as at 36.

A perspective drawing ruler 37 includes a first straight edge rule 38 and a second straight edge rule 39 each pivotally connected to move freely about an opposite end of a link 40. This connection is by a pair of screws 41 each mounted in and extending upwardly from one of said straight edge rules and by a pair of hand posts 42 each threadably mounted on one of said screws. An opening 43 is provided in each end of the link 40 to allow for freedom of pivotal movement of each of the rules with respect to the length.

For purposes of illustration in Fig. 1, it is assumed that the object to be drawn in enlarged perspective is an L-shaped building; but, of course, the same principles would apply whatever object was chosen. A normal top plan view is indicated at 44 in Fig. 1 as it appears when drawn on a sheet of drawing paper in the drawing plane 22 of the drawing board 21. A front elevational view 45 drawn to the same scale is located just below the top plan view in Fig. 1. In order to best utilize the drafting apparatus of the invention to produce an enlarged perspective of the building, a reversed or mirror top plan view 46 is drawn to the same scale as are views 44 and 45. With the ring pin 34 positioned as seen in Fig. 1 on the display board 23 to indicate the location of the eye of an observer, the mirror plan view 46 is fastened to the base plane of the display board so that it has the desired relationship to the eye of the observer as represented by the ring pin. A horizon line 47—47 is laid out on the drawing plane parallel to the picture plane line 26 and passing through the front elevational view 45 at the height at which it is desired that the observer's eye be placed with respect to the finished perspective drawing. The T-square 30 is moved to the left in Fig. 1 until the thread 33 between the ring pin 34 and the picture plane line 26 is parallel to an end wall 48 of the building. The thread 33 and the straight edge 31 will then intersect the picture plane line 26 at a point 50 and a line drawn vertically along the straight edge 31 through this point will intersect the horizon line 47—47 at the point 51 to determine the left hand vanishing point. The T-square 30 can then be moved to the right until thread 33 is at right angles to its position just described which will locate it parallel with an end wall 49 of the building. A right hand vanishing point 52 can then be similarly located and determined.

The various lines of heights of the corners of the building in perspective can be very rapidly located using the thread rule. For example, with the thread 33 in position shown in Fig. 1 passing through the wall intersection 53, the straight edge 31 of the T-square 30 is in position to be used to draw a line on the drawing plane 22 representing that wall intersection. The various dotted lines radiating outwardly from the ring pin 34 representing the eye of an observer and intersecting the picture plane line 26 indicate various positions of the thread 33 as it passes through other wall intersection points on the mirror planned view 46. The vertical dotted lines extending downwardly from each of these points on the picture plane line 26 established various positions of the straight edge of the T-square as it is used to draw the various lines locating the lines of height.

The front elevational view 45 is now utilized to determine the true height of the building in order that the apparent vertical positions of the various vertical lines of height may be established. Since the picture plane can be thought of as passing through the picture plane line perpendicularly with respect to the base plane 25 of the display board 23, it will be noticed that the picture plane will be behind the building as it appears in perspective on the drawing plane 22 of the drawing board 21. To find the apparent height of the wall intersection 53 and of the wall intersection 54 as identified in the mirror top planned view 46, a line passing through the points 53 and 54 is projected to the picture plane line 26 at a point 55. That is to say, a line parallel to the line 34—50 and passing through wall intersections 53 and 54 will intersect the picture plane line 26 at 55. A line projected vertically downwardly from point 55 can now be considered as locating the projection of the end wall 48 at the picture plane. A horizontal line passing through the top surface 56 of the building as seen on the front elevational view 45 will intersect the vertical projecting downwardly from the point 55 at a point 57 and a line passing through the bottom surface 58 of the building as seen in that view will intersect the vertical line through point 55 at 59. Just how these points and the vanishing point are used to obtain the apparent heights of the wall intersection 53 and 54 will be explained at a further description of the perspective drawing ruler 37 and its relationship to the drawing plane 21.

A position pin 60 is forced into the drawing board 21 at the left hand vanishing point 51 and a positioning pin 61 is forced into the drawing board at the right hand vanishing point 52. These positioning pins are exactly the same as positioning pins 62, 63 and 64 disclosed in Figs. 3 and 6. Pin 64, as best seen in Fig. 6, has a point 65 extending into the drawing board 21 and a cylindrical shank 66 extending outwardly from said point. Positioned on this pin is a spring clip 67 which includes a pair of arms 68, 68 each having a J-shaped outer end portion 69. Each of said arms 68 is integral with a coil spring 70. This coil spring is of size to fit on the shank 66 of each of the positioning pins as best seen in Figs. 4 and 6. The spring clips are designed to slideably support flat strips or arms such as the first and second straight edge rules 38 and 39. The clips are so constructed that the arms 68, 68 thereof are under spring tension due to the action of the coil spring 70 to move in direction away from each other. This results in the spring clip 67 holding the flat strip therein tightly against the positioning pin while letting the strip slide longitudinally past said pin. The straight edge rules 38 and 39 so held can then be moved freely over the surface of the drawing plane as desired but the straight edge 31 thereof will always be coincident with the vanishing point.

The first straight edge rule will then be moved as described to have the straight edge thereof passing through the point 57 in the drawing plane. Since the straight edge is already passing through the left hand vanishing point, a line drawn along the straight edge will intersect the line shown in alinement with the straight edge 31 of the thread rule at a point 71 at the apparent top of the wall intersection 53 through which the thread 33 extends. This line will intersect the next vertical line at a point 72 at the apparent top of the wall intersection 54. The portion of this line designated 71—72 is the perspective projection of the intersection of the top surface 56 and the wall 48 of the building.

The first straight edge rule can be moved to pass the straight edge thereof through the point 59 and the intersection of the wall 48 and the bottom surface 58 can be drawn in. Having established the apparent height of the wall intersection 53, the perspective drawing ruler 37 can be moved to position the second straight edge to coincide with the point 71. Since this straight edge is already coincident with the right vanishing point 52, a line drawn from point 71 to the next dotted vertical line to the right will show the perspective projection of the intersection of the top surface 56 with a wall 73 as identified on the mirror planned view 46. The intersection of the bottom surface of the building and the wall 73 can be similarly determined. The shape of the perspective projection of the entire building can be obtained in a similar manner.

While, for clarity of explanation, this description has indicated that all vertical lines of height can be obtained using the thread ruler first and the lines depending on the positioning of the perspective drawing ruler be drawn in second, it is obvious that it is not practical or desirable to follow any such order in actually drawing a perspective view of a complicated or even a simple structure. In practice, the thread ruler and the perspective drawing ruler will be used alternately and interchangeably. For this reason, both have been designed so that the perspective drawing ruler will slide over top of the T-square of the thread rule without obstruction.

When the lines projected outwardly from the ring pin 34 at right angles to each other to intersect with the picture plane line do so at a place that is not in vertical alinement with a part of the drawing board, the vanishing point is not located on the drawing board but is located in a projection of the drawing plane 22 outwardly of the board. This situation is illustrated in Fig. 3 where a right vanishing point 74 is located to the right of the drawing board 23. To compensate for this fact and to allow the second straight edge rule to slide freely on the board while keeping a projection of its straight edge in alinement with the second vanishing point 74, a pair of positioning pins 63 and 64 are pushed into the drawing board to lie on a line 87—87 perpendicular to the horizon line 47—47 and to be equal distance from said horizon line. Two sliding arms 75 and 76 are fastened with spring clips 67 to slide on the positioning pins 63 and 64 respectively and second straight edge rule 39 is slideable with respect to the two arms.

In order to provide for the sliding action of the second straight edge rule 39 with respect to said arms 75 and 76, a slide plate 77 is provided as a part of the sliding arm assembly and is slidably mounted on said rule 39 as at 78. The slide plate 77 is provided with an arcuate slot 79 therein. Sliding arm 75 is integral with a clamp plate 80. A threaded bolt 81 extends upwardly from said slide plate 77 to have an axis thereof coincident with the straight edge of the straight edge rule 39. Openings are provided in the sliding arm 75 at the point where the clamp plate 80 is integral therewith and at an outer end portion of the sliding arm 76 so that these two arms can be pivotally mounted with respect to said slide plate on said bolt 81. A second opening is provided in the sliding arm 76 to be in alinement with arcuate slot 79 and a threaded bolt 82 having a head 83 is adapted to pass upwardly through said arcuate slot of said slide plate 77 and through said second opening in said sliding arm 76. A knurled nut 84 is for use on the threaded bolt 81. A washer 85 is provided to fit on the threaded bolt 82 and a knurled nut 86 is for use over said washer on said threaded bolt 82 to fixedly clamp said slide plate 77, said sliding arm 75 and said sliding arm 76 to have fixed angular relationship with each other.

In order to determine the proper angular relationship between the two sliding arms and the second straight edge rule 39, or, stated differently, between the two sliding arms and the slide plate 77 which slides in fixed angular relationship to the second straight edge rule, it is first necessary to calculate the distance from the intersection of the vertical line 87—87 and the horizon line 47—47 to the vanishing point 74. Once this has been done, the angle between a line from positioning pin 63 to the vanishing point 74 and the horizon line can be determined. The parts can then be positioned so that the angular relationship between a straight edge 88 of the sliding arm 75 and the straight edge of the second straight edge rule 39 can be made equal to 90 degrees less the angle above determined. The same angular relationship will be set up between a straight edge 89 of the sliding arm 76 and said straight edge of said rule 39. Knurled nuts 84 and 86 will be tightened to preserve this relationship. Since the spring clips 67 will hold the straight edge portions of the sliding arms 75 and 76 in contact with the positioning pins 63 and 64 respectively, the straight edge of the rule 39 or a projection thereof would always pass through the vanishing point 74. The angular relationship between the sliding arms 76 and 75 and the rule 39 necessary to cause the straight edge of the rule 39 or an extension thereof to be always coincident with the vanishing point 74 when the sliding arms are manually held against the pins 63 and 64 and the method of determining that relationship are not new and form no part of the invention. The apparatus used to maintain the arms in contact with the pins and to maintain the angle between the parts while allowing the rule 39 to slide over the surface of the drawing board 21 is what is claimed to be new.

While, as disclosed, the vanishing point 74 in Fig. 3 is not on the drawing board and the vanishing point coincident with the positioning pin 62 is on the drawing board, it is obvious that apparatus similar to that shown on the right side of the drawing board would also be used on the left side thereof in the event that the vanishing point to the left was also off of the board. In other words, an assembly including a slide plate, two sliding arms and two positioning pins can be utilized in connection with either or both or neither of the straight edge rules of the perspective drawing ruler 37. This assembly can be very simply removed or added to a straight edge rule such as 38 or 39 by sliding the slide plate thereof off of or onto said rule.

What is claimed is:

1. Drafting apparatus of the character described including a display board provided with a flat display surface and a picture plane line constituted as a straight outer edge of said display surface, a drawing board provided with a flat drawing surface positioned with respect to said display board to have said picture plane line adjacent to said drawing surface, a thread ruler including a first straight edge rule having a first straight edge along one side thereof and a thread attached to one end of said straight edge rule to be coincident with said first straight edge, means for supporting said straight edge rule on said drawing board to hold said straight edge in perpendicular relationship with respect to said picture plane line while permitting movement of said rule parallel to said line and to position said thread in adjacent relationship to said picture plane line, a ring pin having an opening therethrough to just receive said thread, said ring pin being removeably mounted on said display board, resilient means for maintaining a portion of said thread between said rule and said ring pin when said thread is passed through said ring pin in taut condition, a perspective drawing ruler including second and third straight edge rules, means for linking said second and third rules to each other for free pivotal movement in a single plane, a plurality of positioning pins adapted to be removeably situated in said drawing board to extend above the drawing surface thereof, and means for holding at least one of said straight edge rules to have a straight edge portion thereof in sliding contact with one of said positioning pins.

2. The combination as specified in claim 1 and a slide plate slidably mounted on one of said second and third straight edge rules, a pair of sliding arms each independently pivotally mounted with respect to said plate about an axis coincident with a straight edge of said straight edge rule, means for clamping said plate and said arms to have fixed angular relationship to each other, and means for holding a straight edge portion of each of said sliding arms in sliding contact with one of said positioning pins.

3. The combinaton as specified in claim 1 wherein said means for holding said straight edge rule in sliding contact with said positioning pin consists of a spring clip which includes a pair of arms, and resilient means connecting each of said arms to the other at first ends thereof, each of said arms having a J-shaped outer end portion at a second end thereof adapted to fit over an edge of said straight edge rule opposite said straight edge to hold an upper surface of said rule in contact with said arms when said positioning pin is in contact with said straight edge and said resilient means extends around such positioning pin at a side thereof spaced from said straight edge, said resilient means constantly urging each of said arms outwardly with respect to the other.

4. The combination as specified in claim 1 wherein said means of holding said straight edge rule in sliding contact with said positioning pin consists of a spring clip which includes a coil spring adapted to fit over said positioning pin, a pair of arms each integral with and extending outwardly from one end of said coil spring, and each of said arms having a J-shaped outer end portion adapted to fit over an edge of said straight edge rule opposite said straight edge thereof to hold an upper surface of said rule in contact with said arms, and said arms being urged outwardly with respect to each other by the action of said coil spring to cause said J-shaped end portions thereof to bear against said rule to hold said straight edge against said positioning pin.

5. Drafting apparatus for producing an enlarged perspective view from a plan view and an elevational view of an object including a display board provided with a flat display surface and a picture plane line constituted as a straight outer edge of said display surface, a drawing board provided with a flat drawing surface positioned with respect to said display board to have said picture plane line adjacent to said drawing surface, a cleat fixed to an edge portion of said drawing board to have a supporting surface thereof adjacent said drawing board and extending perpendicularly upwardly from said drawing surface, said supporting surface being parallel with said picture plane line, a ring pin having an opening therethrough removably mounted on said display board, a thread ruler including a T-square having a head and a straight edge portion fixedly mounted with respect to said head to have a straight edge thereof perpendicular to said picture plane line when said head is in contact with said supporting surface of said cleat, a thread and means for attaching said thread to an outer end of said straight edge portion of said T-square at a point coincident with said straight edge, said thread being of size to just pass through said ring pin opening, said thread ruler having such relationship to said display board that when said head of said T-square is in contact with said supporting surface, said thread extends through said ring pin opening and said straight edge portion is in contact with said drawing surface, said thread will be in overlying adjacent relationship to said picture plane line, resilient means for maintaining a portion of said thread between said T-square and said ring pin in taut condition, a perspective drawing ruler including first and second straight edge rules, means for linking said rules to each other for free pivotal movement in a single plane, a plurality of positioning pins adapted to be removably situated in said drawing board to extend above the drawing surface thereof, and means for holding at least one of said straight edge rules to have a straight edge portion thereof in sliding contact with one of said positioning pins.

6. In an apparatus of the character described, a display board provided with a flat display surface and a picture plane line constituted as a straight outer edge of said display surface, a drawing board provided with a flat drawing surface positioned with respect to said display board to have said picture plane line adjacent to said drawing surface, a thread ruler including a straight edge rule having a first straight edge along one side thereof, means for supporting said straight edge rule on said drawing board to hold said straight edge in perpendicular relationship with respect to said picture plane line while permitting movement of said rule parallel to said line, a thread attached to one end of said straight edge rule to be coincident with said first straight edge, a ring pin having an opening therethrough to just receive said thread, said ring pin being removably mounted on said display board, said thread rule having such relationship to said display board that when said thread extends through said ring pin opening and said rule is in contact with said drawing surface, said thread will be in overlying adjacent relationship to said picture plane line, and resilient means for maintaining that portion of said thread between said rule and said ring pin in taut condition.

7. The combination with a straight edged rule and a positioning pin of a spring clip for maintaining a first straight edge of said rule in sliding contact with said pin, said clip including a pair of arms, resilient means connecting each of said arms to the other at first ends thereof, each of said arms having a J-shaped outer end portion at a second end thereof, said clip being of size and configuration to fit over said rule and around said pin to have said J-shaped outer end portions of said arms in surrounding relationship to a second edge of said rule and to have said resilient means extending around said pin in contact therewith to hold said pin in contact with said first straight edge of said rule, said resilient means urging said arms in direction away from each other to hold said J-shaped ends thereof in contact with said second edge of said rule.

References Cited in the file of this patent

UNITED STATES PATENTS

| | | |
|---|---|---|
| 1,064,878 | Young | June 17, 1913 |
| 1,657,301 | De Postels | Jan. 24, 1928 |
| 2,665,486 | Barker | Jan. 12, 1954 |
| 2,714,253 | Stone | Aug. 2, 1955 |

FOREIGN PATENTS

| | | |
|---|---|---|
| 360,730 | Great Britain | Nov. 12, 1931 |

OTHER REFERENCES

Industrial Production Illustration, Hoelscher et al., second edition, McGraw-Hill Book Company, Inc., New York, 1946, pages 93–94.